United States Patent
Houston et al.

(10) Patent No.: US 12,047,002 B2
(45) Date of Patent: Jul. 23, 2024

(54) MULTIPHASE VOLTAGE REGULATOR VARIABLE PHASE CONTROL STABILITY

(71) Applicant: Renesas Electronics America Inc., Milpitas, CA (US)

(72) Inventors: Michael Jason Houston, Cary, NC (US); Mehul Shah, Raleigh, NC (US); Warren Schroeder, Raleigh, NC (US); Akshat Shenoy, Harlow (GB)

(73) Assignee: Renesas Electronics America Inc., Milpitas, CA (US)

( * ) Notice: Subject to any disclaimer, the term of this patent is extended or adjusted under 35 U.S.C. 154(b) by 289 days.

(21) Appl. No.: 17/567,018

(22) Filed: Dec. 31, 2021

(65) Prior Publication Data
US 2022/0399813 A1 Dec. 15, 2022

Related U.S. Application Data (60) Provisional application No. 63/210,575, filed on Jun. 15, 2021.

(51) Int. Cl.
*H02M 3/158* (2006.01)
*G05F 1/575* (2006.01)
*H02M 1/00* (2006.01)

(52) U.S. Cl.
CPC .......... *H02M 3/1584* (2013.01); *G05F 1/575* (2013.01); *H02M 1/0009* (2021.05)

(58) Field of Classification Search
CPC .... H02M 3/1582; H02M 3/156; H02M 3/157; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/08; H02M 3/1588; H02M 7/5395; H02M 1/14; H02M 1/0043; H02J 3/46; H02J 3/38

See application file for complete search history.

(56) References Cited

U.S. PATENT DOCUMENTS

| | | | | |
|---|---|---|---|---|
| 8,004,248 B2 * | 8/2011 | Mayega | ............... | H02J 7/00711 320/141 |
| 9,342,086 B2 * | 5/2016 | Houston | ................. | H02M 1/15 |
| 9,374,003 B1 * | 6/2016 | McJimsey | ............. | H02M 3/158 |
| 9,407,145 B1 * | 8/2016 | Burstein | .................. | H03H 7/20 |

(Continued)

*Primary Examiner* — Jeffrey A Gblende
(74) *Attorney, Agent, or Firm* — SCULLY, SCOTT, MURPHY & PRESSER, P.C.

(57) ABSTRACT

Methods and systems for operating a multiphase voltage regulator are described. The multiphase voltage regulator can include a plurality of power stages. A controller can be connected to the plurality of power stages. The controller can detect a number of activated power stages among the plurality of power stages. The controller can adjust a gain of a current sense feedback loop of the controller to control a load-transient response of the multiphase voltage regulator. The adjustment to the gain can be based on the number of activated power stages.

17 Claims, 4 Drawing Sheets

(56) References Cited

U.S. PATENT DOCUMENTS

| | | | |
|---|---|---|---|
| 10,054,970 B2* | 8/2018 | Bhattad | G05F 1/575 |
| 10,637,266 B2* | 4/2020 | Houston | H02J 7/0068 |
| 10,996,249 B2* | 5/2021 | Cianfrocco | H02J 9/04 |
| 2010/0085024 A1* | 4/2010 | Houston | H02M 3/1584 |
| | | | 323/281 |

* cited by examiner

MULTIPHASE VOLTAGE REGULATOR VARIABLE PHASE CONTROL STABILITY

CROSS-REFERENCE TO RELATED APPLICATION

The subject application claims benefit of provisional U.S. Patent Application No. 63/210,575, filed on Jun. 15, 2021. The entire disclosure of U.S. Patent Application No. 63/210,575 is incorporated by this reference.

BACKGROUND OF THE SPECIFICATION

The present disclosure relates in general to operations of power converters. More specifically, the present disclosure relates to controlling a stability of a multiphase voltage regulator.

DC-to-DC voltage conversion may be performed by switching voltage regulators or power converters to convert a voltage from a higher level to a lower level that may be required by a load. An example architecture may distribute the higher voltage to multiple voltage regulators or power stages, and each voltage regulator may produce a same or different voltages for one or more loads. A switching voltage regulator may use two or more power transistors to convert energy from one voltage to another voltage. One example of such a switching voltage regulator may be the Buck Regulator, which typically switches a pair of power transistors to produce a square-wave at a common node between the pair of power transistors. The produced square-wave may be smoothed out using a resonant circuit (e.g., an inductor-capacitor (LC) circuit) to produce a desired voltage for a load. A feedback control loop may be configured to control a duty-cycle of the produced square-wave and a resulting value of an output voltage of the voltage converter.

An example voltage regulator architecture may be a multiphase voltage regulator including multiple power stages, and the power stages can be referred to as phases. Each power stage includes a pair of power transistors (e.g., field-effect transistors (FET)), an inductor and a output capacitor connected to the power stage's output, and a controller. The voltage output from each activated power stage can be interleaved at an output node to produce an overall output voltage. The phases are connected in parallel, and different number of power stages can be activated (e.g., switched on) to output different overall output voltages, thus providing different power levels to a load. Further, each power stage can measure parameters (e.g., inductor current and temperature) between the output node and the power stage's output. The measured parameters can be fed back to a master controller connected to the multiple power stages, and can be used by the master controller to maintain satisfactory performance level of the overall system and to determine optimal number of power stages to be activated.

SUMMARY OF THE INVENTION

In an embodiment, an apparatus for operating a multiphase voltage regulator is generally described. A controller can be connected to a plurality of power stages in the multiphase voltage regulator. The controller can be configured to detect a number of activated power stages among the plurality of power stages. The controller can be further configured to adjust a gain of a current sense feedback loop of the controller to control a load-transient response of the apparatus. The adjustment of the gain can be based on the number of activated power stages.

In another embodiment, a multiphase voltage regulator system is generally described. The multiphase voltage regulator system can include a plurality of power stages and a controller connected to the plurality of power stages. The controller can be configured to detect a number of activated power stages among the plurality of power stages. The controller can be configured to adjust a gain of a current sense feedback loop of the controller to control a load-transient response of the system. The adjustment of the gain can be based on the number of activated power stages.

In another embodiment, a method for operating a multiphase voltage regulator is generally described. The method can include detecting, by a controller, a number of activated power stages among the plurality of power stages. The controller can be connected to a plurality of power stages in the multiphase voltage regulator. The method can further include adjusting, by the controller, a gain of a current sense feedback loop of the controller to control a load-transient response of the multiphase voltage regulator. The adjustment of the gain can be based on the number of activated power stages.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

Figure 1:
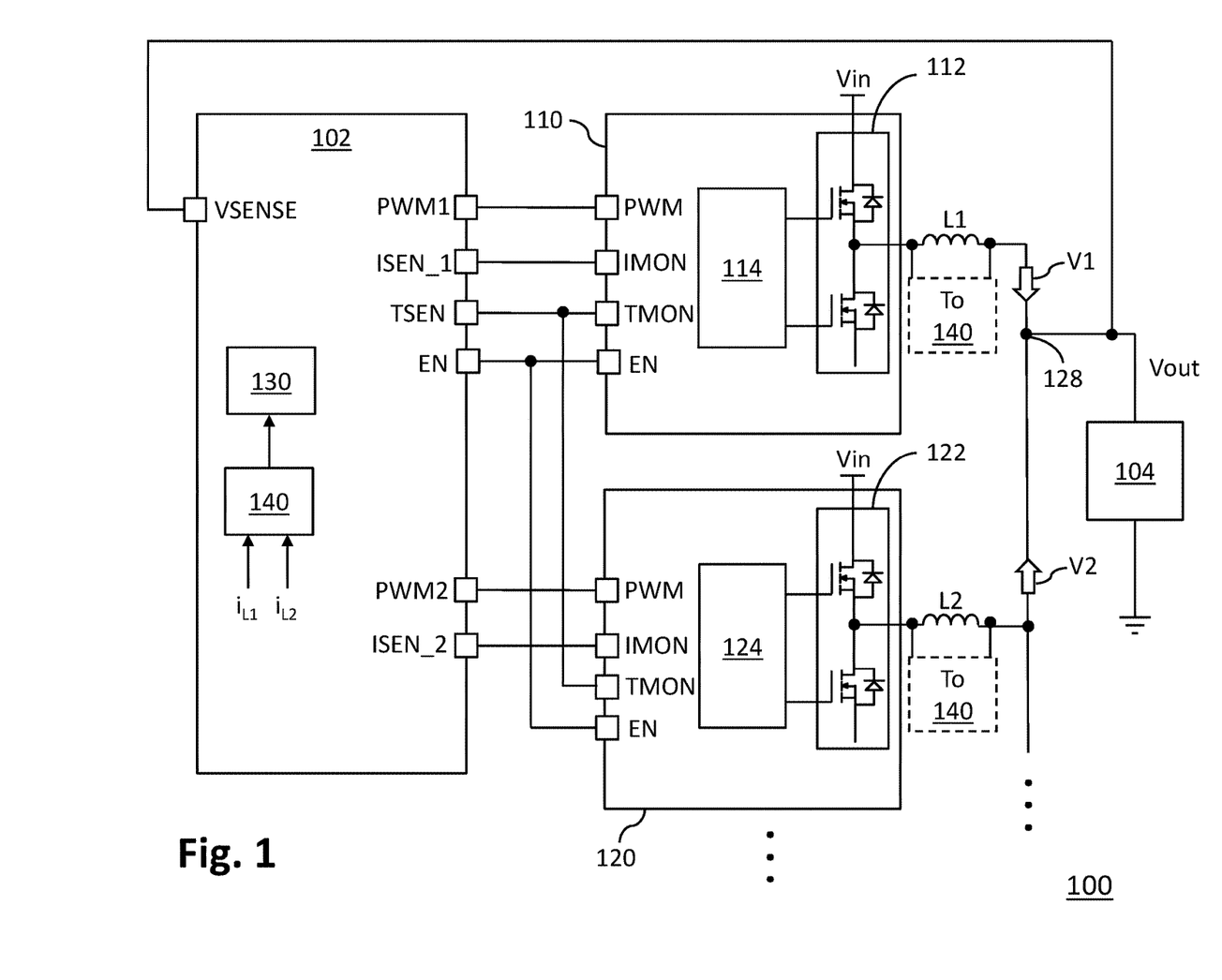
FIG. 1 is a diagram showing an example system that can implement multiphase voltage regulator variable phase count stability in one embodiment.

FIG. 1 is a diagram showing an example system that can implement multiphase voltage regulator variable phase count stability in one embodiment. The system 100 may be an apparatus implementing a multiphase voltage regulator including a controller 102 and at least one voltage regulators or power stages, such as a power stage 110 and a power stage 120. In an example, the controller 102 may be a master controller, or a multiphase controller, and the power stages 110, 120 may include DC-DC converters. The controller 102 may be configured to control the power stage 110 using a pulse width modulation (PWM) signal PWM1 being sent from the controller 102 to a PWM pin of the power stage 110. The power stage 110 may include a power transistor pair 112 and a power stage controller 114. The power transistor pair 112 may include a high side field-effect transistor (FET) and a low side FET. The PWM signal PWM1 can be a control signal that switches the power transistor pair 112 to convert an input voltage Vin into an output voltage V1.

The controller 102 may be configured to control the power stage 120 using another PWM signal PWM2 being sent from the controller 102 to a PWM pin of the power stage 120. The power stage 120 may include a power transistor pair 122 and a power stage controller 124. The power transistor pair 122 may include a high side FET and a low side FET. The PWM signal PWM2 can be a control signal that switches the power transistor pair 122 to convert the input voltage Vin into an output voltage V2. The output voltages V1 and V2 can be combined or interleaved at a node 128 to produce an overall output voltage Vout to a load 104. The voltage levels of V1 and V2 can be the same as Vout, but may be staggered or out of phase from one another.

In one or more examples, the power stages 110, 120 may be current-sourced devices, voltage-sourced devices, or a device implementing both current and voltage-sourced control. In an example, the power stages 110, 120 may be smart power stage (SPS) devices configured to perform voltage regulation with additional features such as feedback control based on feedback voltage and/or feedback current, or other parameters such as temperature, measured at the outputs of the power stages in the system 100. For example, the power stages 110, 120 can provide operating temperatures of the power stages 110, 120 from the TMON pin of the power stages 110, 120 to a TSEN pin of the controller 102. In another example, the power stages 110, 120 can measure inductor currents $i_{L1}$, $i_{L2}$, of the inductors L1, L2, respectively. The power stages 110, 120 can provide the measured inductor current to the controller 102 from their IMON pins of the power stages 110, 120 to the ISEN_1 and ISEN_2 pins of the controller 102, respectively. Further, a measurement of the output voltage Vout can be fed back to the controller 102 (e.g., received at a VSENSE pin of the controller 102) for various control applications.

In an aspect, the power stage controllers 114, 124, of the power stages 110, 120 can be configured to process the measured parameters of the power stages 110, 120, respectively, before providing the measured parameters to the controller 102. For example, the power stage controllers 114, 124 can amplify and/or calibrate the measured parameters prior to providing them to the controller 102. The power stage controllers 114, 124 can also include drivers configured to drive the power transistor pairs 112, 122 of the power stages 110, 120, respectively.

The controller 102 can be configured to use feedback signals such as the sensed output voltage Vout, sensed current (e.g., the currents $i_{L1}$, $i_{L2}$, or current proportional to $i_{L1}$, $i_{L2}$), and/or temperature information (e.g., operating temperature) to control and maintain the performance of the system 100 at a satisfactory level (e.g., within predefined specifications). For example, if the sensed current returned from the power stages 110, 120 indicates the load 104 is not drawing as much current as expected, the controller 102 can deactivate one or more power stages in the system 100 to reduce an overall power consumption of the system 100. In an aspect, the controller 102 can enable the power stages in the system 100 individually via an enable pin EN of the controller 102 and an enable pin EN of each of the power stages 110, 120. The enable pin EN of the controller 102 can be connected to the enable pins EN of the power stages 110, 120 using a specific bus (e.g., a single wire or single trace).

In an example, the controller 102 can be a microcontroller including hardware components such as integrated circuits (IC), memory devices, and other hardware and circuit components. The controller 102 can include a modulator 130 configured to generate PWM signals for the power stages connected to the controller 102, such as the PWM signal PWM1 and the PWM signal PWM2. The modulator 130 can receive the output voltage Vout at a VSENSE pin of the controller 102, or a feedback voltage signal that may be a sensed or proportional signal indicative of Vout. The controller 102 can include a current synthesizer 140 configured to receive the inductor currents $i_{L1}$, $i_{L2}$, etc., sensed from the output inductors of the power stages in the system 100. The current synthesizer 140 can be configured to simulate or synthesized the inductor currents of power stages 110, 120, based on the sensed inductor currents $i_{L1}$, $i_{L2}$, respectively. An output of the current synthesizer 140 (e.g., simulated or synthesized current) can be provided to the modulator 130 to generate and/or adjust the PWM signals PWM1, PWM2.

As a power transistor pair (e.g., 112, 122) in a power stage (e.g., 110, 120) are switched between the on and of states in a rapid manner, the inductor current of the inductors (e.g., $i_{L1}$, $i_{L2}$ of L1 and L2) can ramp up and ramp down repeatedly. The power consumption by the system 100 can increase as more power stages are activated. If the load 104 needs to draw more power, more power stages can be activated—referred to as phase-add. If the load 104 can draw less power, less power stages can be activated—referred to as phase-drop. The phase-add and phase-drop to activate different number of power stages can create load fluctuations, causing unstable load-transient response and sometimes slow load-transient response. To be described in more detail below, the controller 102 can be integrated with specific hardware that can allow the controller 102 to dynamically adjust a gain of the controller 102 and/or the current synthesizer to control the load-transient response in response to phase-add or phase-drop processes.

Figure 2:
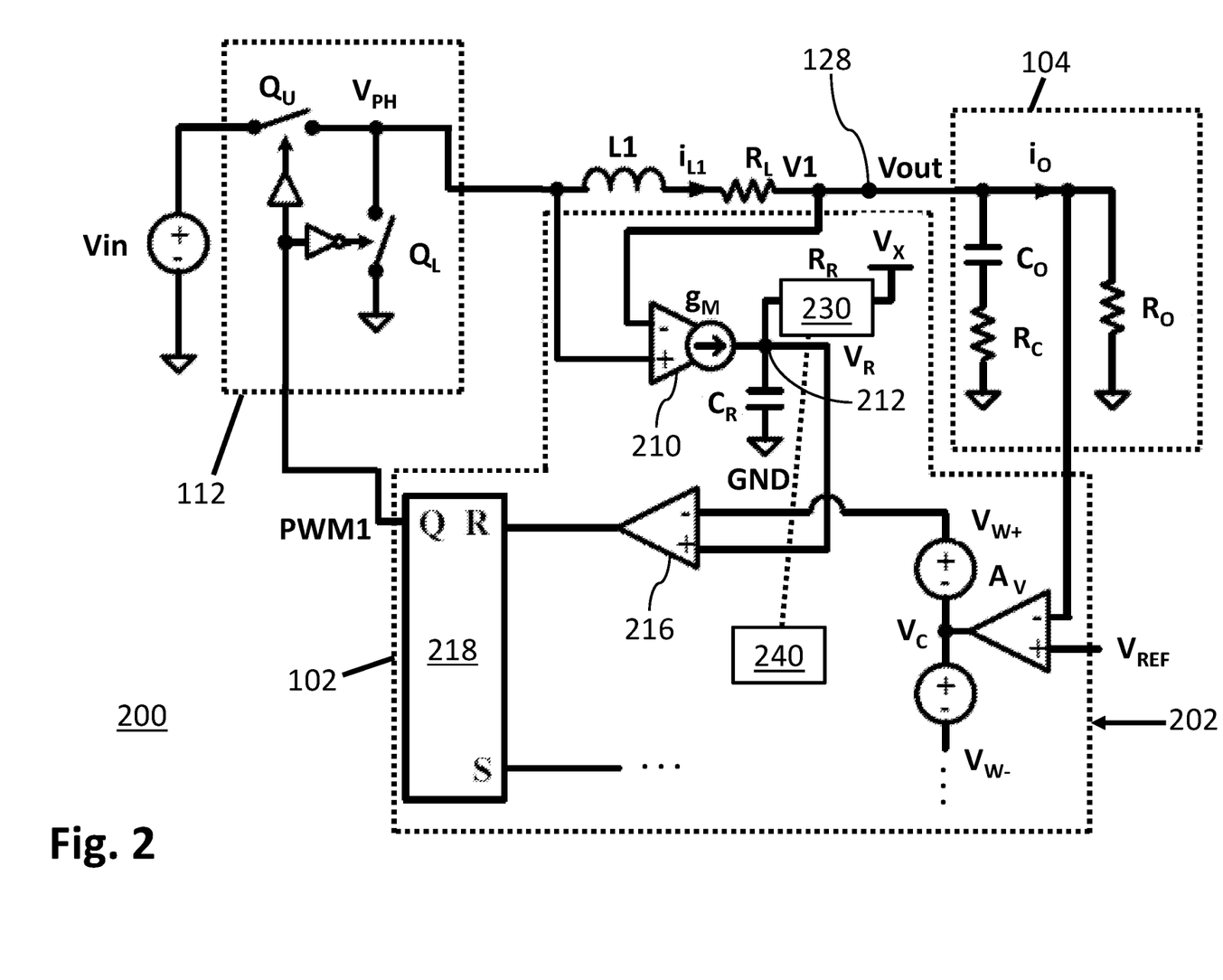
FIG. 2 is a diagram showing additional details of the system of FIG. 1 in one embodiment.

FIG. 2 is a diagram showing additional details of the system 100 of FIG. 1 in one embodiment. In an example shown in FIG. 2, a circuit 200 includes one or more portions of the controller 102, the power stage 110, the load 104, and other components of the system 100 of FIG. 1, are shown in FIG. 2. The details of the power stage 110 shown in FIG. 2 and corresponding descriptions are also applicable to the power stage 120 in FIG. 1, and/or other power stages in the system 100 connected to the controller 102. In the example shown in FIG. 2, the power transistor pair 112 of the power stage 110 (see FIG. 1) can include a high-side transistor $Q_U$ and a low-side transistor $Q_L$. The high-side transistor $Q_U$ and the low-side transistor $Q_L$ can be FETs. The controller 102 can drive the power transistor pair 112 to alternately switch on and switch off the high-side transistor $Q_U$ and the low-side transistor $Q_L$. For example, when $Q_U$ is on, $Q_L$ is off, and vice versa. A phase voltage $V_{PH}$ can be outputted from a node between the high-side transistor $Q_U$ and the low-side transistor $Q_L$ as a result of the switching driven by the PWM1 signal. The phase voltage $V_{PH}$ can create the inductor current $i_{L1}$ across the inductor L1. In response to the phase voltage $V_{PH}$ being applied to the inductor L1, the inductance of L1 and an inherent resistance $R_L$ of the inductor L1 can cause the output voltage V1 to be generated by the power stage 110. The voltage V1 can be interleaved with other output voltages from other power stages at the node 128 to create the overall output voltage Vout for the load 104.

The current synthesizer 140 of the controller 102 can include a transconductance amplifier 210 having a transconductance gain $g_M$. The phase voltage $V_{PH}$ can be received at a non-inverting input of the transconductance amplifier 210, and the output voltage V1 can be received at an inverting input of the transconductance amplifier 210. An output of the transconductance amplifier 210 can be coupled to a ripple node 212. A capacitor having ripple capacitance $C_R$ can be coupled between the ripple node 212 and ground GND. A resistor circuit block 230 having a ripple resistance $R_R$ can be coupled between the ripple node 212 and an internal reference or bias voltage $V_X$. A ripple voltage $V_R$ can be developed from the ripple node 212 based on an output current from the transconductance amplifier 210, the capacitance $C_R$, the internal reference voltage $V_X$, and the ripple resistance $R_R$. The internal reference voltage $V_X$ can be injected into the ripple node 212 to control a stability of the ripple current $V_R$.

The transconductance amplifier 210 can be configured to generate its output current to be proportional to the voltage measured across the inductor L1 (e.g., difference between $V_{PH}$ and V1), in order for the ripple voltage $V_R$ to replicate the ripple current through the inductor L1. The replicated current can be a simulated or synthetic current being outputted by the current synthesizer 140. The injection of $V_X$ into the ripple node 212, with the application of the ripple resistance $R_R$, can introduce an offset to the output current from the transconductance amplifier 210. The introduced offset can be the internal reference voltage $V_X$. In one or more embodiments, the internal reference voltage $V_X$ can be a midpoint voltage, a functional zero, a voltage representing zero for the corresponding phase or power stage (e.g., in this example, power stage 110), etc.

The controller 102 can further include a comparator 216. The ripple voltage $V_R$ can be received by a non-inverting input of the comparator 216, and a positive window voltage $V_{W+}$ can be received by an inverting input of the comparator 216. The positive window voltage $V_{W+}$ can be based on a control or reference voltage $V_{REF}$. An output of the comparator 216 is provided to a reset (R) terminal of a SR latch 218 in the controller 102. The SR latch 218 can be a part of the modulator 130 shown in FIG. 1. The SR latch 218 can output the PWM1 signal from an output (Q) terminal of the SR latch 218.

In an aspect, it may be desirable to have a relative high gain $g_M$ because a decrease in the gain $g_M$ can reduce the window voltage $V_{W+}$, introduce higher jitter and lower signal to noise ratio (SNR). A faster comparator (e.g., higher bias) may be required to compensate these issues. In an aspect, the transconductance gain $g_M$ can be a gain of a currents sense feedback loop that includes a path from the nodes across inductor L1 to SR latch 218. An adjustment to transconductance gain $g_M$ can be an adjustment to this current sense feedback loop. In order to increase the gain $g_M$, the ripple resistance $R_R$ can be increased by configuring the resistor circuit block 230. The gain $g_M$ can vary inversely with the value of ripple resistance $R_R$. For example, the gain $g_M$ can increase in response to a decrease in ripple resistance $R_R$. In response to an increase in the gain $g_M$, a speed of the load-transient response of the system 100 can be improved (e.g., increased speed) because the decreased ripple resistance $R_R$ can lower a voltage drop for the load-transient response.

In one embodiment, the resistor circuit block 230 can include a variable resistor (e.g., digital potentiometer). The controller 102 can provide signals of different voltage levels to the variable resistor to change the ripple resistance $R_R$. In another embodiment, the resistor circuit block 230 can include a plurality of resistors. The controller 102 can activate and deactivate different numbers of resistors to change the ripple resistance $R_R$. For example, a plurality of resistors in the resistor circuit block 230 can be connected in parallel, and each resistor can be connected to a switch. The controller 102 can be configured to open and close different number of switches connected to the plurality of resistors to adjust the value of $R_R$. In one embodiment, if the resistor circuit block 230 includes multiple resistors that can be activated or deactivated, the multiple resistors can have the same or different resistance values to provide flexible adjustments of the value of ripple resistance $R_R$.

In one embodiment, the controller 102 can include a memory device configured to store associations 240 between different values of the ripple resistance $R_R$ and different numbers of activated power stages. The associations 240 can be stored as, for example, lookup tables or mappings. In the associations 240, there can be M different values of the ripple resistance $R_R$ associated with N activated power stages. In an example, M can be equivalent to N such that there can be one value of ripple resistance $R_R$ for each number of activated power stages. In another example, M can be less than N such that there can be one value of ripple resistance $R_R$ for each group of activated power stages, where one group of activated power stages can include one or more power stage.

The controller 102 can be configured to configure the resistor circuit block 230 based on the associations 240. The controller 102 can detect a number of activated power stages. For example, the controller 102 can interpret the enable signal on being outputted on the EN pin of the controller 102 to identify which power stages, and how many power stages, are being activated. In one embodiment, based on the number of activated power stages, the controller 102 can refer to the associations 240 to configure the value of the ripple resistance $R_R$. For example, in response to the associations 240 indicating four activated power stages is associated with a resistance value $R_4$, the controller 102 can configure the resistor block to adjust the value of $R_R$ to $R_4$.

In an embodiment, the controller 102 can be configured to adjust the value of the ripple resistance $R_R$ for all power stages that are activated. For example, if the system 100 includes N power stages, there can be N copies of the circuit 200 shown in FIG. 2. If k out of N power stages are activated in the system 100, the controller 102 can adjust the value of the ripple resistance $R_R$ for the k copies of circuit 200. Further, the adjustment to the ripple resistance $R_R$ for all power stages can be the same. For example, the controller 102 can adjust the resistor circuit block 230 in the k copies of circuit 200 to have the same ripple resistance $R_R$ value.

Figure 3:
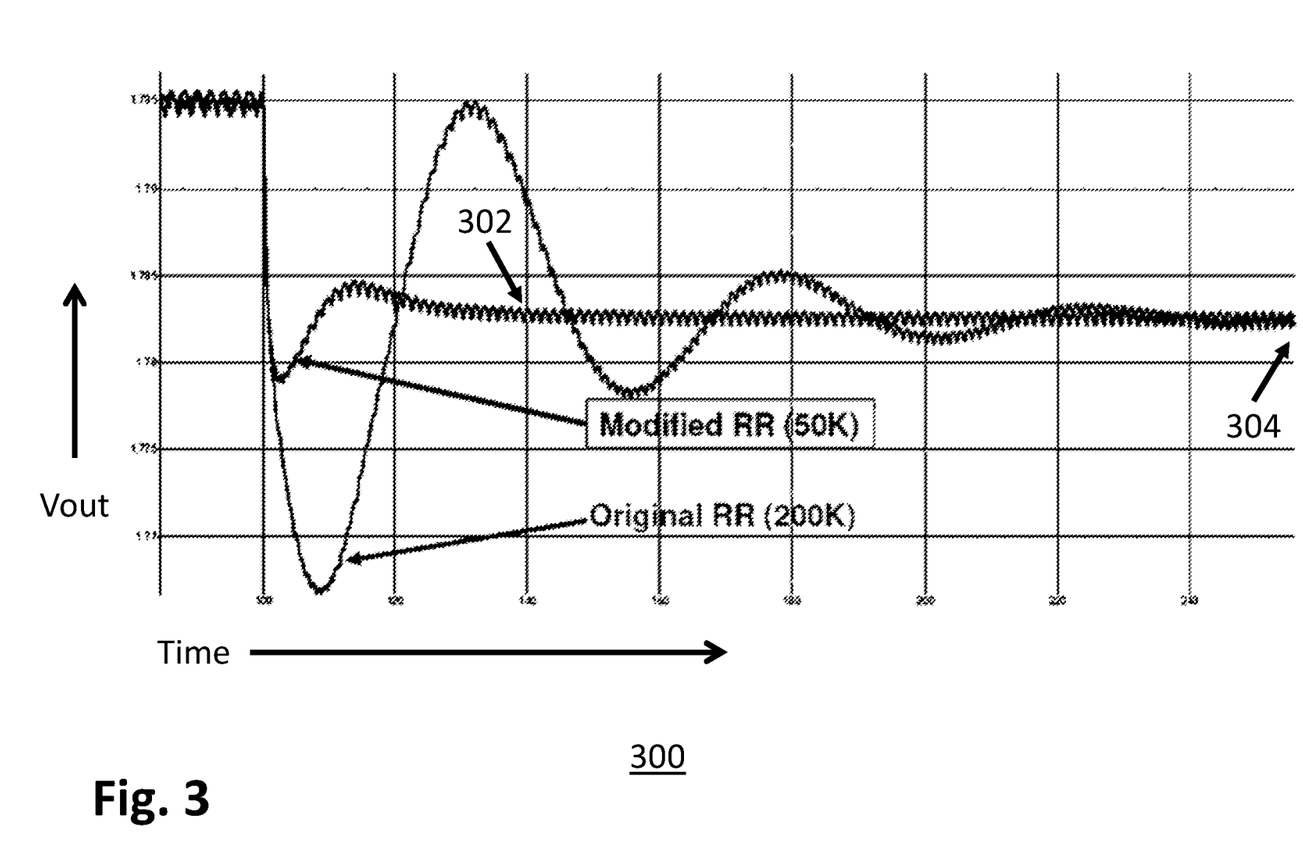
FIG. 3 is a diagram showing a result of an implementation of multiphase voltage regulator variable phase count stability in one embodiment.

FIG. 3 is a diagram showing a result 300 of an implementation of multiphase voltage regulator variable phase count stability in one embodiment. In the result 300, two different curves of a load-transient response of the system 100 in FIG. 1 is shown. A first curve labeled as "Original RR (200K)" is the load-transient response where the value of $R_R$ in FIG. 2 is fixed at 200 kiloohms (kΩ). A second curve labeled as "modified RR (50K)" is the load-transient response where the value of $R_R$ in FIG. 2 is adjusted to 50 kiloohms (kΩ). The load-transient response represented by the first curve and the second curve can be based on the same number of activated phases or power stages in the system 100. As shown by the result 300, a load-transient response based on a higher value of $R_R$ (e.g., first curve becomes steady at a later time 304) can be slower than a load-transient response based on a lower value of $R_R$ (second curve becomes steady at an earlier time 302).

Figure 4:
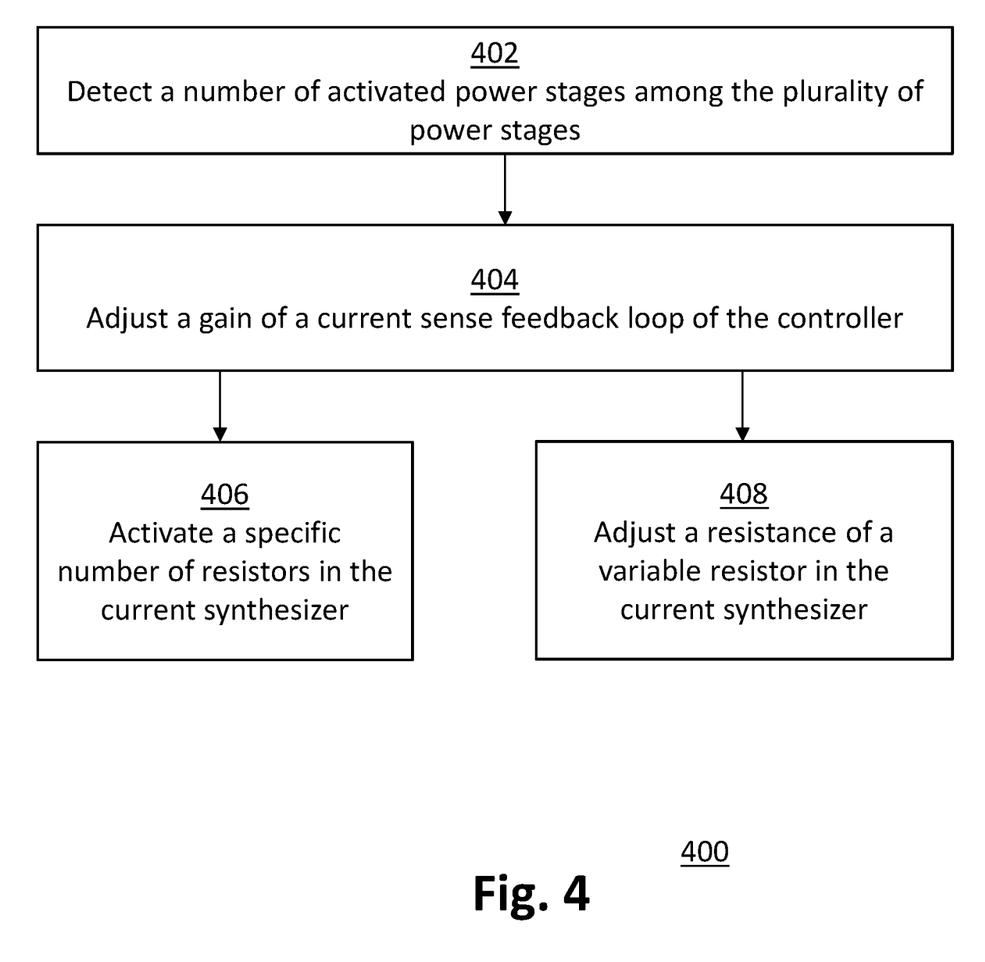
FIG. 4 is a flowchart of an example process that may implement multiphase voltage regulator variable phase count stability according to an embodiment of the disclosure.

FIG. 4 is a flowchart of an example process 400 that may implement multiphase voltage regulator variable phase count stability according to an embodiment of the disclosure. The process 400 can include one or more operations, actions, or functions as illustrated by one or more of blocks 402, 404, and 406 or 408. Although illustrated as discrete blocks, various blocks can be divided into additional blocks, combined into fewer blocks, eliminated, performed in different order, or performed in parallel, depending on the desired implementation.

The process 400 can be performed by a controller (e.g., controller 102 in FIG. 1 and FIG. 2) connected to a plurality of power stages in a multiphase voltage regulator. The process 400 can begin at block 402. At block 402, the controller can detect a number of activated power stages among the plurality of power stages. In one embodiment, a gain of the current synthesizer can increase in response to a decrease in the ripple resistance. In one embodiment, the current synthesizer can correspond to a specific power stage among the activated power stages. For example, the current synthesizer can simulate an inductor current of a specific power stage among the activated power stages.

The process 400 can proceed from block 402 to block 404. At block 404, the controller can adjust a gain of a current sense feedback loop of the controller to control a load-transient response of the multiphase voltage regulator. The adjustment of the gain can be based on the number of activated power stages. In one embodiment, the controller can adjust the gain by adjusting a ripple resistance in a current synthesizer of the controller. In one embodiment, an increase of the gain can increase a speed of a load-transient response of the multiphase voltage regulator. The controller can adjust a gain of current sense feedback loops in other power stages among the activated power stages based on the number of activated power stages.

The operation in the block 404 can be performed by performing either one of block 406 or block 408. At block 406, the controller can adjust the gain by activating a specific number of resistors in the current synthesizer. At block 408, the controller can adjust the gain by adjusting a resistance of a variable resistor in the current synthesizer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
   a controller connected to a plurality of power stages in a multiphase voltage regulator, the controller being configured to:
   detect a number of activated power stages among the plurality of power stages; and
   adjust a ripple resistance in a current synthesizer of the controller to adjust a gain of a current sense feedback loop of the controller to control a load-transient response of the apparatus, wherein the adjustment of the ripple resistance is based on the number of activated power stages.

2. The apparatus of claim 1, wherein the controller is configured to adjust the ripple resistance by activating a specific number of resistors in a current synthesizer of the controller.

3. The apparatus of claim 1, wherein the controller is configured to adjust the ripple resistance by adjusting a resistance of a variable resistor in a current synthesizer of the controller.

4. The apparatus of claim 1, wherein the current sense feedback loop is in a specific power stage among the activated power stages, and the controller is configured to adjust ripple resistance of current sense feedback loops in other power stages among the activated power stages based on the number of activated power stages.

5. The apparatus of claim 1,
   wherein the controller is configured to use associations stored in a memory device to determine a level of adjustment to adjust the ripple resistance, and
   wherein the associations map different numbers of activated power stages to different levels of the ripple resistance.

6. The apparatus of claim 1, wherein the adjustment to the ripple resistance increases a speed of a load-transient response of the apparatus.

7. A system comprising:
   a plurality of power stages;
   a controller connected to the plurality of power stages, the controller being configured to:
   detect a number of activated power stages among the plurality of power stages; and
   adjust a ripple resistance in a current synthesizer of the controller to adjust a gain of a current sense feedback loop of the controller to control a load-transient response of the system, wherein the adjustment of the ripple resistance is based on the number of activated power stages.

8. The system of claim 7, wherein the controller is configured to adjust the ripple resistance by activating a specific number of resistors in a current synthesizer of the controller.

9. The system of claim 7, wherein the controller is configured to adjust the ripple resistance by adjusting a resistance of a variable resistor in a current synthesizer of the controller.

10. The system of claim 7, wherein the current sense feedback loop is in a specific power stage among the activated power stages, and the controller is configured to adjust ripple resistance of current sense feedback loops in other power stages among the activated power stages based on the number of activated power stages.

11. The system of claim 7, further comprises a memory device configured to store associations that map different numbers of activated power stages to different levels of the ripple resistance, wherein the controller is configured to use the associations stored in the memory device to determine a level of adjustment to adjust the ripple resistance.

12. The system of claim 7, wherein the adjustment to the ripple resistance increases a speed of a load-transient response of the system.

13. A method for operating a multiphase voltage regulator, the method comprising:
   detecting, by a controller connected to a plurality of power stages in a multiphase voltage regulator, a number of activated power stages among the plurality of power stages; and
   adjusting, by the controller, a ripple resistance in a current synthesizer of the controller to adjust a gain of a current sense feedback loop of the controller to control a load-transient response of the multiphase voltage regulator, wherein the adjustment of the ripple resistance is based on the number of activated power stages.

14. The method of claim 13, wherein adjusting the ripple resistance comprises activating, by the controller, a specific number of resistors in a current synthesizer of the controller.

15. The method of claim 13, wherein adjusting the ripple resistance comprises adjusting, by the controller, a resistance of a variable resistor in a current synthesizer of the controller.

16. The method of claim 13, wherein the current sense feedback loop is in a specific power stage among the activated power stages, and the method further comprises adjusting, by the controller, ripple resistance of current sense feedback loops in other power stages among the activated power stages based on the number of activated power stages.

17. The method of claim 13, wherein adjusting the ripple resistance leads to an increase in a speed of a load-transient response of the multiphase voltage regulator.

* * * * *